United States Patent [19]

Hayashi et al.

[11] Patent Number: 5,251,712
[45] Date of Patent: Oct. 12, 1993

[54] AIR INTAKE DEVICE HAVING AN INTAKE DUCT FOR AN AUTOMOTIVE VEHICLE

[75] Inventors: Kiyoshi Hayashi, Hatsukaichi; Tadayuki Odamura, Hiroshima, both of Japan

[73] Assignee: Mazda Motor Corporation, Hiroshima, Japan

[21] Appl. No.: 903,828

[22] Filed: Jun. 24, 1992

[30] Foreign Application Priority Data

Jun. 24, 1991 [JP] Japan .................. 3-056637[U]

[51] Int. Cl.$^5$ ............................................. B60K 13/02
[52] U.S. Cl. ............................ 180/68.3; 55/385.3
[58] Field of Search ............... 180/68.1, 68.2, 68.3; 55/385.3, 418; 123/41.56

[56] References Cited

U.S. PATENT DOCUMENTS

| | | | |
|---|---|---|---|
| 2,881,860 | 4/1959 | Ternes | 180/68.3 X |
| 4,984,350 | 1/1991 | Hayashi | 180/68.3 X |
| 5,042,603 | 8/1991 | Olson | 180/68.3 |
| 5,141,068 | 8/1992 | Mendicino | 180/68.3 |

FOREIGN PATENT DOCUMENTS 63-82880 4/1988 Japan .

*Primary Examiner*—Margaret A. Focarino
*Assistant Examiner*—Michael Mar
*Attorney, Agent, or Firm*—Fish & Richardson

[57] ABSTRACT

An air intake device for an automotive vehicle which comprises a upper shroud member interconnecting front ends of a pair of wheel apron reinforcements and a radiator disposed below the upper shroud member. An intake port of an intake duct for the vehicle is disposed near an upper portion of the upper shroud member. The air intake device also includes a sealing panel member disposed in front of the upper shroud member for forming an air passage which leads fresh air to the intake port. The sealing panel member comprises a pair of panels which forms a part of the air passage between both inside ends of the panels.

11 Claims, 4 Drawing Sheets

AIR INTAKE DEVICE HAVING AN INTAKE DUCT FOR AN AUTOMOTIVE VEHICLE

BACKGROUND OF THE INVENTION

1. Field of the Invention

The present invention relates to an air intake device having an intake duct, such as an engine air cleaner duct, for an automotive vehicle, and more particularly to an air intake device in which a sealing panel member is arranged to prevent fresh air containing particles of water, snow, dust or other similar particles from flowing into the intake duct.

2. Description of the Related Art

A known air intake device for inducting air into an intake duct of an engine air cleaner includes an upper shroud member that is arranged to interconnect front ends of a pair of wheel apron reinforcements. The reinforcements extend in the direction of the vehicle length and form the side portions of an engine compartment. A radiator of an engine is disposed below the upper shroud member. An intake port of an air cleaner duct is positioned near an upper portion of the upper shroud member. A sealing panel member is attached to the upper shroud member so as to cover over a space in front of the radiator. Part of the fresh air passing through a fresh air inlet formed at the portion of a front grille or bumper of the vehicle flows along an under surface of the sealing panel member toward both of the side ends thereof. Then this fresh air goes round the both side ends and flows up to an upper surface of the sealing panel. This air is then conducted to the intake port of the air cleaner duct through a passage formed by the upper surface of the sealing panel member and an under surface of an engine hood.

In cases where the foregoing sealing panel member is not provided, a part of fresh air flowing through the fresh air inlet into a space between the front grille or bumper of the vehicle and the radiator will go into the intake port of the air cleaner directly without the stream direction changing greatly. This stream of fresh air tends to contain lots of particles of water, snow, dust or other similar particles which lower the function of the engine air cleaner. This is because, depending on the driving conditions, the fresh air to be taken in contains these kinds of particles. These particles can be effectively eliminated from entering the air cleaner by bending the stream of the air greatly.

The foregoing sealing panel member takes the fresh air in the intake port and changes its direction by an angle of 90 degrees or more. Therefore, many particles contained in the air run against the surfaces of the sealing panel member and engine hood, and are trapped there.

In general, the sealing panel member consists of one panel extending to a large extent in front of the upper shroud member. Accordingly, most parts of the fresh air to be conducted into the intake duct comes along the upper surface of the sealing panel member after going around both of the outer ends of the sealing panel member. This bent stream of air increases its flow resistance and causes a problem that the amount of the air taken into the engine air cleaner is reduced and restricted.

SUMMARY OF THE INVENTION

It is an object of the present invention to provide an air intake device having an intake duct for an automotive vehicle which eliminates particles contained in the air effectively while maintaining the amount of air to be supplied to the intake duct. This object is accomplished by providing an air intake for supplying fresh air to an intake duct of an automotive vehicle, comprising:

a upper shroud member interconnecting front ends of a pair of wheel apron reinforcements on the automotive vehicle;

an intake port of the intake duct disposed near an upper portion of the upper shroud member;

a radiator disposed below the upper shroud member;

a fresh air inlet disposed at a front face portion of the automotive vehicle so that fresh air inducted through the fresh air inlet passes into a space formed between the front face portion of the automotive vehicle and the radiator; and a sealing panel member disposed in front of the upper shroud member and the radiator so as to substantially cover the space between the front face portion of the automotive vehicle and the radiator, the sealing panel member defining an air passage through which the fresh air inducted into the space flows between the front face portion of the automotive vehicle and the radiator toward the inlet port of the intake duct in cooperation with a hood of the automotive vehicle, the sealing panel member comprising a pair of panels each disposed so as to extend along a width of the automotive vehicle, each panel having an inside end which approaches the other panel and is disposed so that there is a predetermined vertical distance between the inside ends of the panels and so that each end overlaps the other, whereby a portion of the air passage is formed between the inside ends of the panels.

The present invention also can be accomplished by an air intake for supplying fresh air to an intake duct for an automotive vehicle, comprising:

a upper shroud member interconnecting front ends of a pair of wheel apron reinforcements on the automotive vehicle;

an intake port of the intake duct disposed near an upper portion of the upper shroud member;

a radiator disposed below the upper shroud member;

a fresh air inlet disposed at a front face portion of the automotive vehicle so that fresh air inducted through the fresh air inlet passes into a space formed between the front face portion of the automotive vehicle and the radiator; and a sealing panel member disposed in front of the upper shroud member and the radiator so as to substantially cover the space between the front face portion of the automotive vehicle and the radiator, the sealing panel member defining an air passage through which the fresh air inducted into the space flows between the front face portion of the vehicle and the radiator toward the inlet port of the intake duct in cooperation with a hood of the vehicle, the sealing panel member comprising a first member disposed in front of the intake port of the intake duct and second member disposed adjacent to the first member, the second member including an inside end which is spaced below an inside end of the first member by a predetermined distance so that a portion of the air passage is formed between the first and second members.

BRIEF DESCRIPTION OF THE DRAWINGS

The above object and other objects and features of the present invention will be apparent to those skilled in the art from the following description of the preferred embodiments thereof when considered in conjunction with the appended drawings in which.

DETAILED DESCRIPTION OF THE PREFERRED EMBODIMENTS

Figure 1:
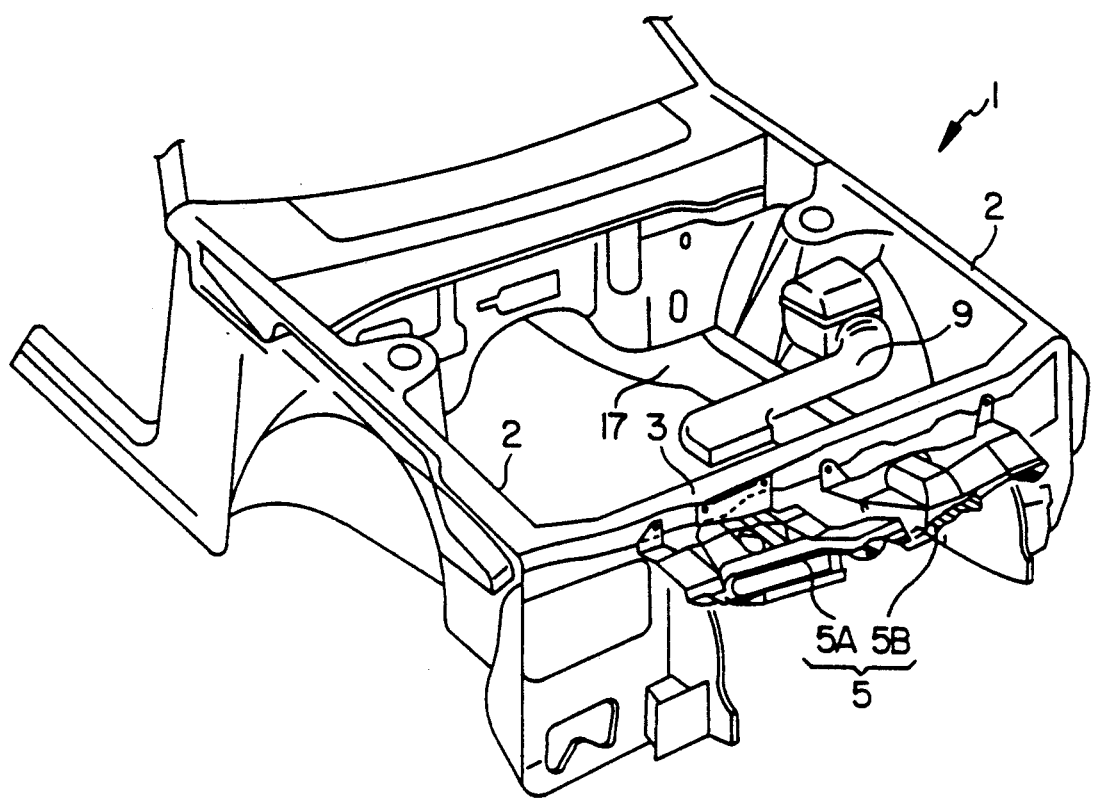
FIG. 1 is a perspective view of a front body structure of a vehicle in accordance with a preferred embodiment of the present invention.
Figure 2:
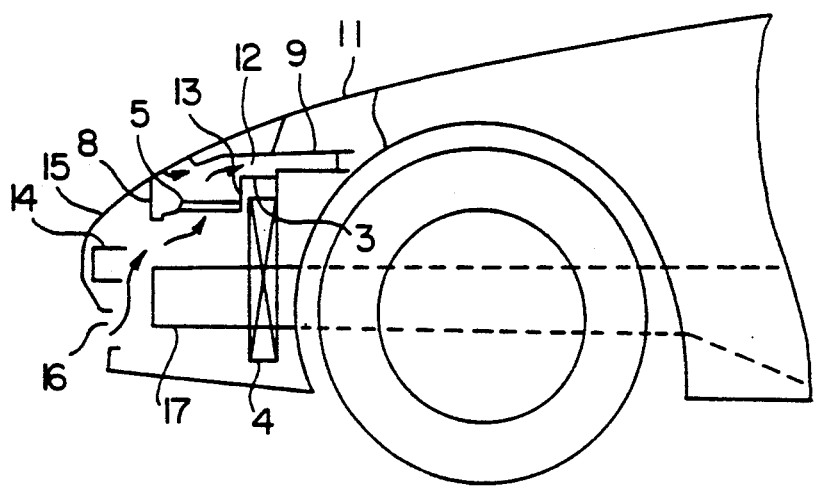
FIG. 2 is a side view of the front body structure, partially cut away, of the vehicle.
Figure 3:
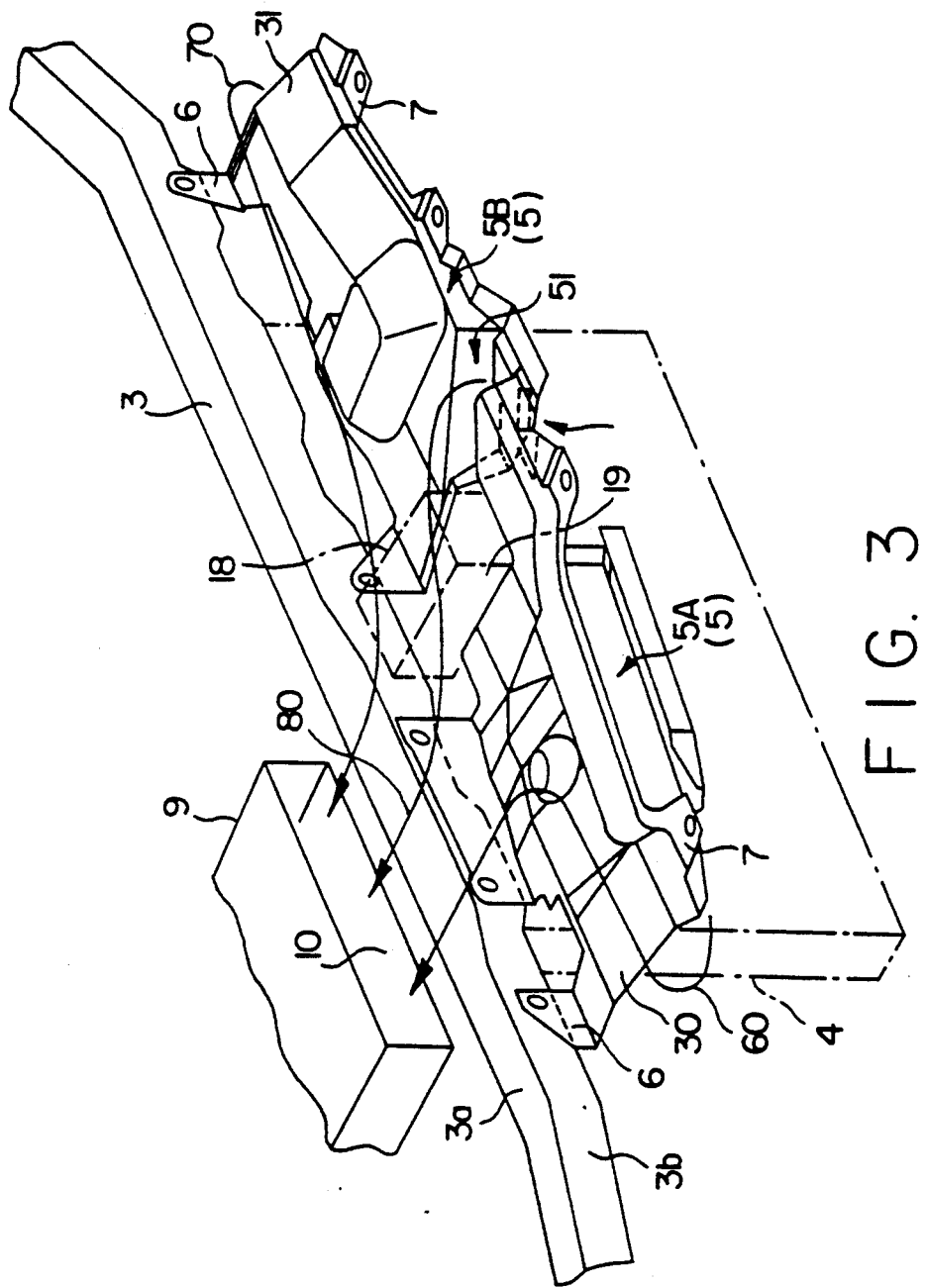
FIG. 3 is an enlarged perspective view of a sealing panel member which is connected to a upper shroud member.
Figure 4:
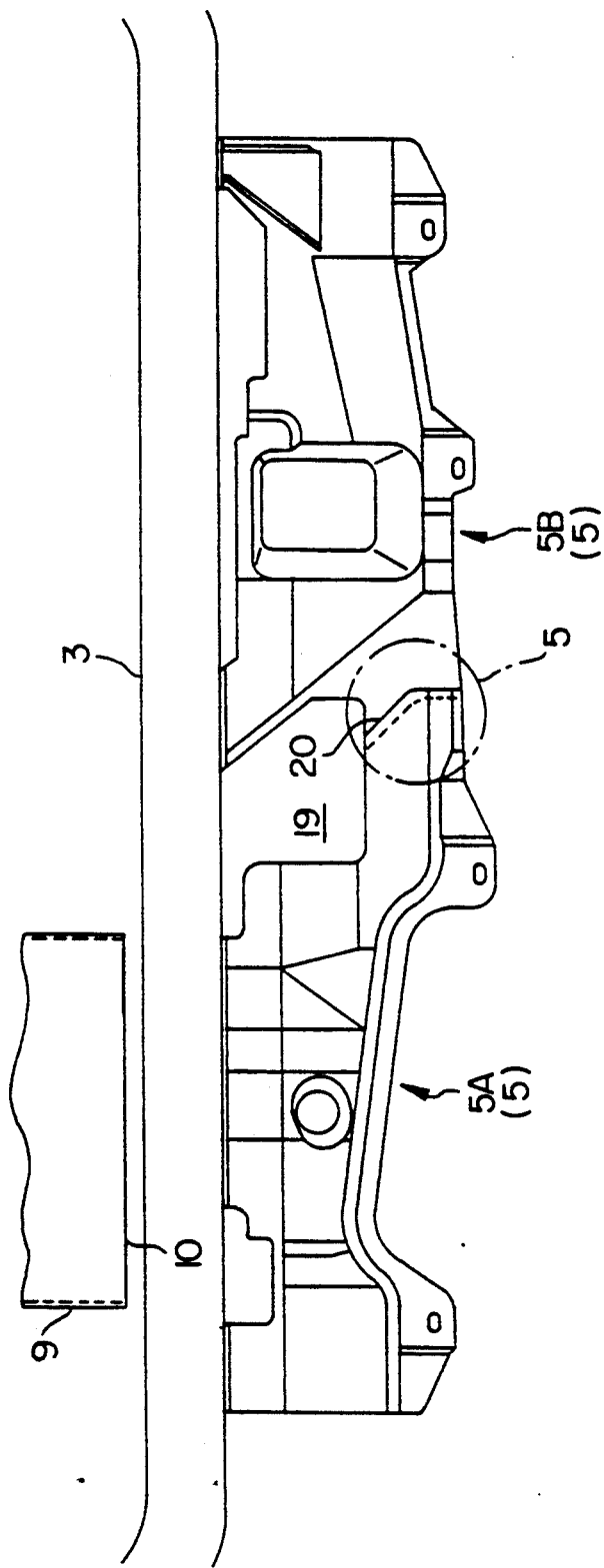
FIG. 4 is a plan view of the sealing panel member which is connected to the upper shroud member.
Figure 5:
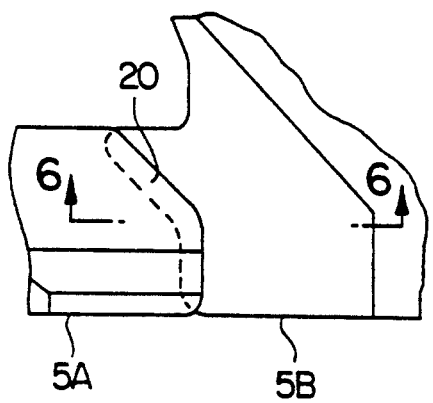
FIG. 5 is an enlarged plan view of an overlapped portion of the sealing panel member.
Figure 6:
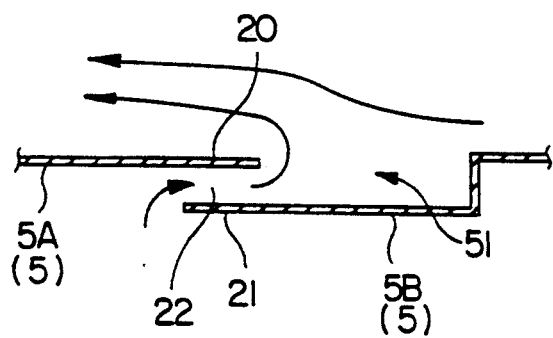
FIG. 6 is an enlarged cross sectional view of FIG. 5, as seen along section line 6—6.

As seen in FIG. 1 through FIG. 3, a upper shroud member 3 is provided at a front end portion of an automotive vehicle body 1 between a pair of wheel apron reinforcements 2. A radiator 4 is attached to a center portion of the upper shroud member 3. A sealing panel member 5 is secured, which extends in the direction of vehicle width, to a middle portion of the upper shroud member 3. The sealing panel member 5 is disposed substantially at the same level as a lower portion of the upper shroud member 3. The sealing panel member 5 consists of a pair of panels, i.e., a right panel 5A and a left panel 5B, which are fixed respectively to a front surface 3b of the upper shroud member 3 through a plurality of brackets 6 thereof by a connecting means such as bolts. These panels 5A, 5B are also secured to a connecting member 8 which is fixed to a front end portion of the vehicle through a plurality of locations disposed along front end portions 7 thereof.

An intake duct 9 of an engine air cleaner which is disposed in an engine compartment extends along the upper shroud member 3. An intake port 10 of the intake duct 9 is placed near an upper face 3a of the upper shroud member 3. The right panel 5A is disposed just in front of the intake port 10 of the intake duct 9. As shown in FIG. 2, a panel member 13 is provided on an inside surface of a front portion of a engine hood 11 so as to form an upper air space 12 for conducting fresh air into the intake port 10 of the intake duct.

A front bumper 14 is disposed at a front end of the vehicle and covered with a soft face member 15 made of synthetic resin. A fresh air inlet 16 is formed on a lower portion of the soft face member 15. Fresh air is taken into a space between the soft face member 15 and the radiator 4. In FIG. 2, numeral 17 denotes a front frame member disposed at the side of the vehicle body.

The sealing panel member 5 is described more in detail referring to FIGS. 3 through 6. The right and left panels 5A, 5B are made of synthetic resin, and have a cut out portion 19, at inside end thereof, for providing a space where a hood lock device 18 is to be arranged. Furthermore, the left panel 5B has a downwardly stepped portion 51 at a front and inside portion thereof, so that a right end portion 21 of the left panel 5B is positioned below and overlapped with a left end portion 20 of the right panel 5A. Accordingly, an air passage 22 is formed between both end portions of the right and left panels 5A, 5B, i.e., the left end portion 20 of the right panel 5A and the right end portion 21 of the left panel 5B.

In the present embodiment, the left end portion 20 of the right panel 5A is disposed higher than the right end portion 21 of the left panel 5B because of the disposition of the intake port 10 of the intake duct arranged in back of the right panel 5A. In case the intake port 10 of the intake duct is arranged on the left of the vehicle, that is, in back of the left panel 5B to the contrary, it is preferred to dispose the right end portion 21 of the left panel 5B higher than the left end portion 20 of the right panel 5A.

The operation of the intake device now will be described. At first, fresh air flows into the space between the soft face member 15 and the radiator 4 through the fresh air inlet 16. Then the fresh air goes up above the panels 5A, 5B by going around the ends of these panels 5A, 5B. Finally, most of the fresh air flows into the intake port 10 of the intake duct 9. That is, streams of fresh air flowing into the intake port 10 are mainly constituted by the following three streams. The first stream 60 flows over the right panel 5A after going around a right end 30 thereof. The second stream 70 flows over the left panel 5B after going around a left end 31 thereof. The third stream 80 flows into the inlet port 10 after passing through the air passage 22 formed by the left end portion 20 of the right panel 5A and the right end portion 21 of the left panel 5B.

Each of these streams of the fresh air makes a turn. Therefore, most particles contained in the fresh air, such as dust, run up against the surfaces of the sealing panels 5A, 5B and the panel member 13, and are trapped thereby while the fresh air is flowing. Additionally, since the air passage 22 is formed near the intake port 10 of the intake duct 9, the required amount of air can be delivered to the engine air cleaner.

It is to be understood that although the invention has been described in detail with respect to a preferred embodiment thereof, various other embodiments and variants are possible which fall within the spirit and scope of the invention, and such embodiments and variants are intended to be covered by the following claims.

What is claimed is:

1. An air intake for supplying fresh air to an intake duct of an automotive vehicle, comprising:
    an upper shroud member interconnecting front ends of a pair of wheel apron reinforcements on said automotive vehicle;
    an intake port of the intake duct disposed near an upper portion of the upper shroud member;
    a radiator;
    a fresh air inlet disposed at a front face portion of the automotive vehicle so that fresh air inducted through the fresh air inlet passes into a space formed between the front face portion of the automotive vehicle and the radiator; and
    a sealing panel member disposed in front of the upper shroud member and the radiator so as to substantially cover the space between the front face portion of the automotive vehicle and the radiator, the sealing panel member defining an air passage through which the fresh air inducted into the space flows between the front face portion of the automotive vehicle and the radiator toward the inlet port of the intake duct in cooperation with a hood of the automotive vehicle, the sealing panel member comprising a pair of panels each disposed so as to extend along a width of the automotive vehicle, each said panel having an inside end portion which approaches the other panel and is disposed so that there is a predetermined vertical distance between the inside end portions of the panels and so that each said end portion overlaps the other, whereby a portion of the air passage is formed between the inside end portions of said panels wherein a portion of said air entering said fresh air inlet flows upwardly from said space into said air passage formed by said inside end portions of said first and second panels and exits upwardly towards said intake port.

2. An air intake as defined in claim 1, wherein said panels further comprise a bracket for fixedly attaching said panels to a front face of said upper shroud member.

3. An air intake as defined in claim 1, wherein said panels are connected to said front face portion of the automotive vehicle by a connecting member.

4. An air intake as defined in claim 1, wherein one of said pair of panels includes a downwardly stepped portion adjacent its inside end portion, the stepped portion defining a part of said air passage in cooperation with the inside end portion of the other of said pair of panels overhanging the stepped portion.

5. An air intake device as defined in claim 1, wherein said panels and said hood of the automotive vehicle form an upper air space into which fresh air streams from the space between the front face portion of the automotive vehicle and the radiator by passing through said air passage formed between said panels and by passing around opposite outer ends of said panels.

6. An air intake as defined in claim 1, wherein said hood of the automotive vehicle includes a panel member provided on an inside surface thereof, said panel member defining a portion of an upper air space formed by the panel member, said panels, said upper shroud member and said hood of the automotive vehicle.

7. An air intake device as defined in claim 1, wherein said intake air duct is a duct of an air cleaner for an engine.

8. An air intake device as defined in claim 1, wherein at least one of said pair of panels includes a cut out portion on the inside end thereof for providing a space for a hood lock device.

9. An air intake for supplying fresh air to an intake duct for an automotive vehicle, comprising:
an upper shroud member interconnecting front ends of a pair of wheel apron reinforcements on said automotive vehicle;
an intake port of the intake duct disposed near an upper portion of the upper shroud member;
a radiator
a fresh air inlet disposed at a front face portion of the automotive vehicle so that fresh air inducted through the fresh air inlet passes into a space formed between the front face portion of the automotive vehicle and the radiator; and
a sealing panel member disposed in front of the upper shroud member and the radiator so as to substantially cover the space between the front face portion of the automotive vehicle and the radiator, the sealing panel member defining an air passage through which the fresh air inducted into the space flows between the front face portion of the vehicle and the radiator toward the inlet port of the intake duct in cooperation with a hood of the vehicle, the sealing panel member comprising a first member disposed in front of the intake port of the intake duct and second member disposed adjacent to the first member, the second member including an inside end portion which is spaced below an inside end portion of the first member by a predetermined distance so that a portion of the air passage is formed between the first and second members, wherein a portion of said air entering said fresh air inlet flows upwardly from said space into said air passage formed by said inside end portions of said first and second members and exits upwardly towards said intake port.

10. An air intake device as defined in claim 9, wherein said second member includes a downwardly stepped portion, the stepped portion being adjacent to said inside end portion of said second member.

11. An air intake device as defined in claim 10, wherein said inside end portions of the first member and the second member are overlapped with each other.

* * * * *